US012517625B2

(12) United States Patent
Ghosh et al.

(10) Patent No.: US 12,517,625 B2
(45) Date of Patent: Jan. 6, 2026

(54) USER INTERFACE INTERACTION ELEMENTS WITH ASSOCIATED DEGREES OF FREEDOM OF MOTION (71) Applicant: INTUITIVE SURGICAL OPERATIONS, INC., Sunnyvale, CA (US)

(72) Inventors: Sarthak Ghosh, Sunnyvale, CA (US); Brandon D. Itkowitz, San Jose, CA (US); Paul W. Mohr, Mountain View, CA (US); Erik D. Wakefield, Issaquah, WA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 0 days.

(21) Appl. No.: 18/852,283

(22) PCT Filed: Mar. 30, 2023

(86) PCT No.: PCT/US2023/016874
§ 371 (c)(1),
(2) Date: Sep. 27, 2024

(87) PCT Pub. No.: WO2023/192465
PCT Pub. Date: Oct. 5, 2023

(65) Prior Publication Data
US 2025/0199655 A1 Jun. 19, 2025

Related U.S. Application Data (60) Provisional application No. 63/326,652, filed on Apr. 1, 2022.

(51) Int. Cl.
G06F 3/04815 (2022.01)
A61B 34/00 (2016.01)
G06F 3/0346 (2013.01)

(52) U.S. Cl.
CPC .......... *G06F 3/04815* (2013.01); *A61B 34/25* (2016.02); *G06F 3/0346* (2013.01)

(58) Field of Classification Search
CPC .......................... G06F 3/04815; G06F 3/0346
See application file for complete search history.

(56) References Cited

U.S. PATENT DOCUMENTS

| 12,399,552 B2 * | 8/2025 | Noohi Bezanjani .... G06F 3/011 |
| 2003/0204364 A1 * | 10/2003 | Goodwin ................ G06F 3/016 |
| | | 702/152 |

(Continued)

FOREIGN PATENT DOCUMENTS

| EP | 3866174 A1 | 8/2021 |
| WO | WO-2016077543 A1 | 5/2016 |
| WO | WO-2021167954 A1 | 8/2021 |

OTHER PUBLICATIONS

International Preliminary Report on Patentability for Application No. PCT/US2023/016874, mailed Oct. 10, 2024, 08 pages.

(Continued)

*Primary Examiner* — Ariel A Balaoing
(74) *Attorney, Agent, or Firm* — Haynes & Boone, LLP (57) ABSTRACT A method may comprise displaying an interaction panel on a display device. The interaction panel having a display frame of reference and include a plurality of interaction elements. The method may also comprise constraining motion of an operator interface device to translational motion in a haptic plane with a haptic plane constraint while the interaction panel is displayed and determining a cursor position in the display frame of reference that corresponds to a position of a selection portion of the operator interface device in an operator frame of reference. The method may also comprise determining an element type for a first interaction element of the plurality of interaction elements at which the cursor position is located and removing the haptic (Continued)

plane constraint on the operator interface device if the element type is a three-dimensional rotation type.

20 Claims, 9 Drawing Sheets

(56) References Cited

U.S. PATENT DOCUMENTS

| | | | | |
|---|---|---|---|---|
| 2009/0036902 A1* | 2/2009 | DiMaio | .................... | A61B 8/12 |
| | | | | 606/130 |
| 2016/0338782 A1* | 11/2016 | Bowling | ................. | A61B 34/20 |
| 2017/0333139 A1* | 11/2017 | Suresh | .................. | A61B 34/35 |
| 2019/0099230 A1* | 4/2019 | Suresh | .................. | A61B 34/37 |
| 2019/0339804 A1* | 11/2019 | Gleeson | ................ | G06F 3/0485 |
| 2023/0074495 A1* | 3/2023 | Iorgulescu | ............. | A61B 17/17 |
| 2024/0111357 A1* | 4/2024 | Noohi Bezanjani | ... | A61B 34/74 |

OTHER PUBLICATIONS

International Search Report and Written Opinion for Application No. PCT/US2023/016874, mailed Jul. 26, 2023, 13 pages.
Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

\* cited by examiner

USER INTERFACE INTERACTION ELEMENTS WITH ASSOCIATED DEGREES OF FREEDOM OF MOTION

CROSS-REFERENCED APPLICATIONS

This application is the U.S. national phase of International Application No. PCT/US2023/016874, filed Mar. 30, 2023, which designated the U.S. and claims priority to and benefit of U.S. Provisional Application No. 63/326,652 filed Apr. 1, 2022 and entitled "User Interface Interaction Elements With AssociatedDegrees of Freedom of Motion," all of which are incorporated by reference herein in their entirety.

FIELD

The present disclosure is directed to systems and methods for presenting graphical user interface interaction elements that correspond to degrees of freedom of motion available to an input interface device.

BACKGROUND

During a medical procedure that may be performed using robot-assisted minimally invasive medical tools, a clinician or other operator may be provided with a graphical user interface. The graphical user interface may include an image of a three-dimensional field of view of the patient anatomy and may include interaction elements, such as menus, buttons, switches, or other elements that allow a user to access information or control system functions. Improved systems and methods are needed to present graphical user interface elements that enable an operator to interface efficiently and effectively with interaction elements having different degrees of freedom of motion.

SUMMARY

The embodiments of the invention are best summarized by the claims that follow the description.

In one example embodiment, a method may comprise displaying an interaction panel on a display device. The interaction panel having a display frame of reference and include a plurality of interaction elements. The method may also comprise constraining motion of an operator interface device to translational motion in a haptic plane with a haptic plane constraint while the interaction panel is displayed and determining a cursor position in the display frame of reference that corresponds to a position of a selection portion of the operator interface device in an operator frame of reference. The method may also comprise determining an element type for a first interaction element of the plurality of interaction elements at which the cursor position is located and removing the haptic plane constraint on the operator interface device if the element type is a three-dimensional rotation type.

In another example, a medical instrument system may comprise a control system, a display device, and an operator interface device in communication with the control system. The control system may comprise a processor and a memory comprising machine readable instructions that, when executed by the processor, cause the control system to display an interaction panel on the display device. The interaction panel may have a display frame of reference and including a plurality of interaction elements. The instructions may also cause the control system to constrain motion of the operator interface device to translational motion in a haptic plane with a haptic plane constraint while the interaction panel is displayed. The instructions may also cause the control system to determine a cursor position in the display frame of reference that corresponds to a position of a selection portion of the operator interface device in an operator frame of reference and determine an element type for a first interaction element of the plurality of interaction elements at which the cursor position is located. The instructions may also cause the control system to remove the haptic plane constraint on the operator interface device if the element type is a three-dimensional rotation type.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In robot-assisted medical procedures, graphical interaction panels including interaction elements, such as menus or other virtual tools, may be used by an operator performing the medical procedure to access information or control the medical system. The operator may use an operator interface device both to control robot-assisted instruments used in the medical procedure and to interface with the interaction elements on the graphical interaction panel. In some examples, the operator interface device may have six degrees of freedom (e.g., three translational degrees of freedom and three rotational degrees of freedom) for use in controlling the robot-assisted instruments. When using the operator interface device to interact with the graphical interaction panel, the operator interface device may be constrained to limit motion to translational motion in a haptic plane. However, some interaction elements on the graphical interaction panel may be manipulated in more or less than two translational degrees of freedom. To allow an operator to naturally and seamlessly move between different types of interaction elements, haptic constraints may be added or removed based on a cursor position and a determination of an element type associated with each interaction element at the cursor position.

Figure 1:
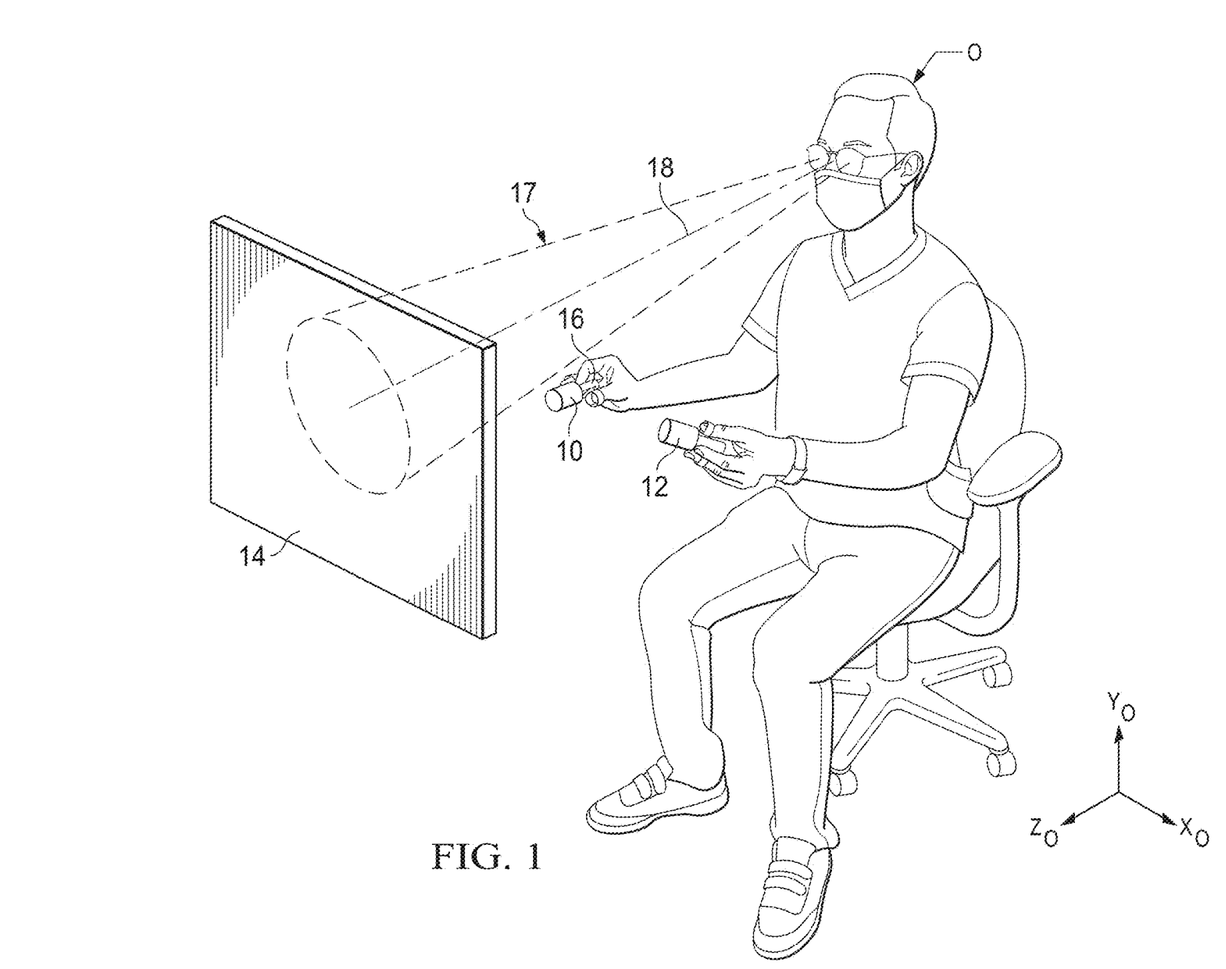
FIG. 1 illustrates an operator of a medical system in an operator environment.

FIG. 1 illustrates a clinician or operator O in an operator environment, having an operator frame of reference $X_O$, $Y_O$, $Z_O$. The operator O may exercise control of a right-hand operator interface device 10 and a left-hand interface device 12 to control tools or virtual interactive elements visible on a display system 14. In some examples the interface devices 10, 12 may be part of a robot-assisted medical system (e.g. interface devices 336) such as medical system 310 described in greater detail below. In some examples, the interface devices 10, 12 may be in wireless communication with a control system. In other examples, the interface devices may be grounded and directly coupled to an operator console, a control system, or other component in the operator frame of reference. A selection portion 16 of the interface device 10 may correspond to a position at which a tip portion of the operator's index finger is located. In other examples, the selection portion may correspond to other portions of the operator interface device. In some examples, when the robot-assisted medical system is in an instrument control mode or instrument "following" mode, the interface devices 10, 12 may be movable in six degrees of freedom to provide corresponding movement to assigned tools in the anatomic environment. In some examples, the robot-assisted medical system may exit the following mode and enter an auxiliary mode in which one or both of the interface devices 10, 12 may be used to interface with virtual elements, such as menus, anatomic models, or system controls, that are displayed on the display system. The interface device(s) may include one or more of any number of a variety of input devices, such as hand grips, joysticks, trackballs, data gloves, trigger-guns, hand-operated controllers, touch screens, body motion or presence sensors, and other types of input devices. A viewing cone 17 around a central viewing axis 18 may intersect the display system.

Figure 2:
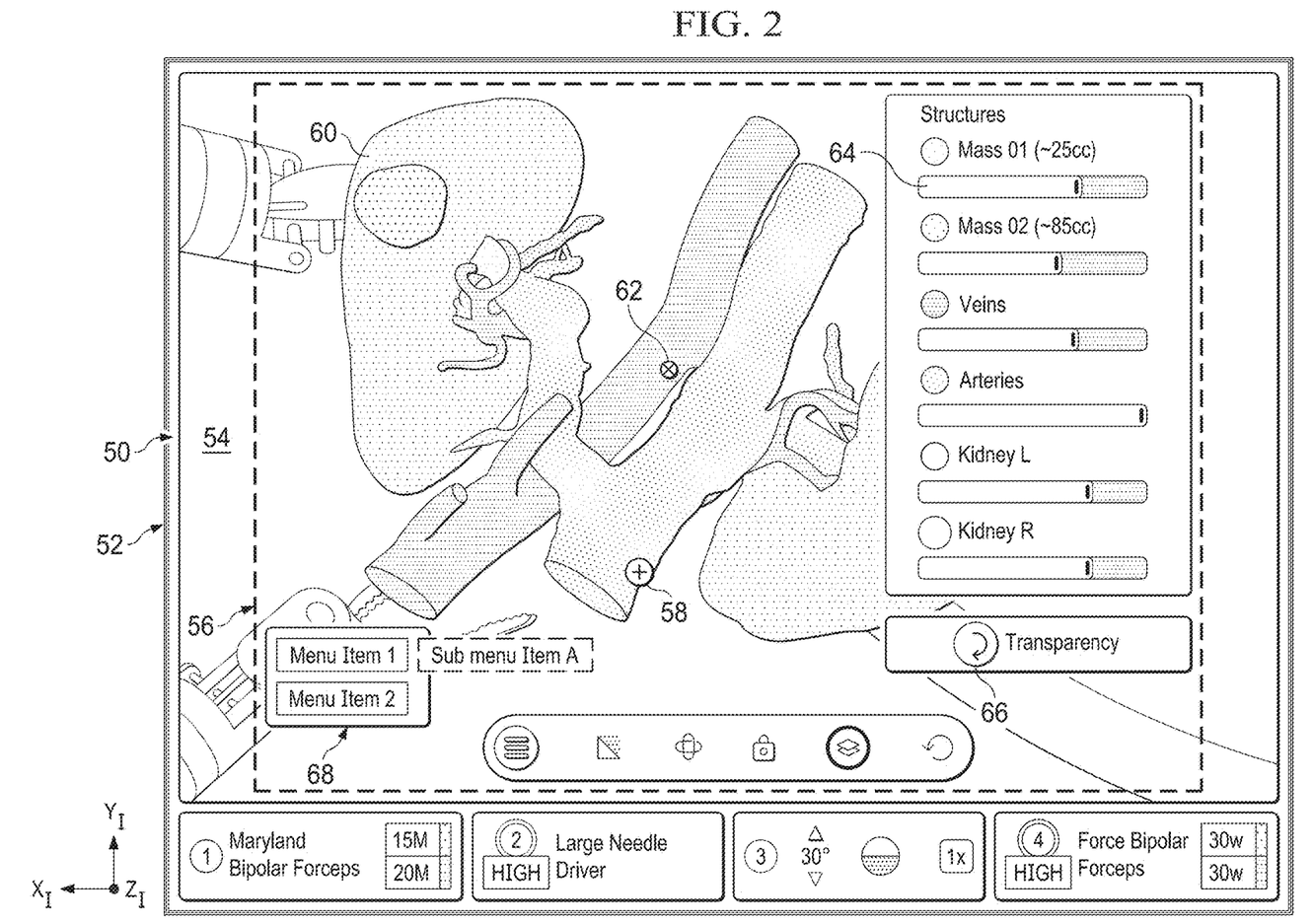
FIG. 2 illustrates a graphical user interface including interaction elements, according to some examples.

FIG. 2 illustrates a graphical user interface 50 displayed on a display system 52 (e.g., display system 14). In this example, the graphical user interface 50 may include an image 54 of a field of view provided by an imaging instrument (e.g., the endoscopic imaging system 315 described below) within an anatomic environment in a patient anatomy. In this example, the image 54 may be a three-dimensional, stereoscopic image, but in other examples, the image may be a two-dimensional image. The graphical user interface 50 may have an image frame of reference $X_I$, $Y_I$, $Z_I$. The operator frame of reference $X_O$, $Y_O$, $Z_O$ may be registered to the image frame of reference $X_I$, $Y_I$, $Z_I$. This alignment of the reference frames allows operator hand motions in each of the cardinal directions to correspond to movement within the image. To access additional information about anatomic structures, system functions, and/or system information, the medical system, operator may exit the following mode of medical system and enter an auxiliary mode. In the auxiliary mode, the graphical user interface 50 may display a cursor 58 and an interaction panel 56 displayed over the field of view image 54. The cursor 58 may track the motion of a selection portion of the operator interface device (e.g., the selection portion 16 of the device 10 where a user's index finger is positioned). The interaction panel 56 may include movable or manipulatable interaction elements that may each be characterized by a predetermined element type based, for example, on the type of motion of which the interaction element is capable. For example, an interaction element 60 may be a three-dimensional (3D) rotation type interaction element that is rotatable in three rotational directions. In this example, the interaction element may be a 3D global model of anatomic organs such as kidneys. The 3D model interaction element may be rotatable in up to three directions about a centroid 62. An interaction element 64 may be a one-dimensional translation type interaction element such as a slider bar that is manipulatable in a single linear direction (e.g., the $X_I$ direction). An interaction element 66 may be a one-dimensional rotation type interaction element such as a dial that is manipulatable in a single rotational direction. An interaction element 68 may be a two-dimensional translation type interaction element such as a two dimensional menu that is manipulatable in a two translational directions. In other examples, interaction elements may be movable in other combinations of translational and/or rotational directions.

In the auxiliary mode of the medical system, during which the interaction panel 56 is displayed, motion of an operator interface device, such as the operator interface device 10, may be mapped to motion of the cursor 58. A haptic plane constraint may be placed on the operator interface device 10, while in the auxiliary mode, to constrain the six-degree of freedom operator interface device to the degrees of freedom of motion corresponding to translational motion along the haptic plane (e.g., the $X_O$ and $Y_O$ directions that correspond to the $X_I$ and $Y_I$ directions, respectively). The degrees of freedom of motion (e.g., three rotational degrees of freedom and a Z-direction translational direction) that are unused for motion along the haptic plane may be restricted using a restraint force as force feedback on the operator interface device 10. For example and with reference to FIG. 11, gimbal orientation degrees of freedom of the operator interface device may be locked to prevent motion in unused degrees of freedom. The haptic plane may serve as a "virtual mouse pad," promoting hand stability and intuitive correspondence between two-dimensional input motion and the resultant cursor 58 motion. In some examples, the haptic plane may be adjustable to remain generally perpendicular to the central viewing axis 18 so that if a viewing angle between the operator and the display device changes (e.g., based on ergonomic adjustments), the haptic plane may also change to maintain the same orientation.

Figure 3:
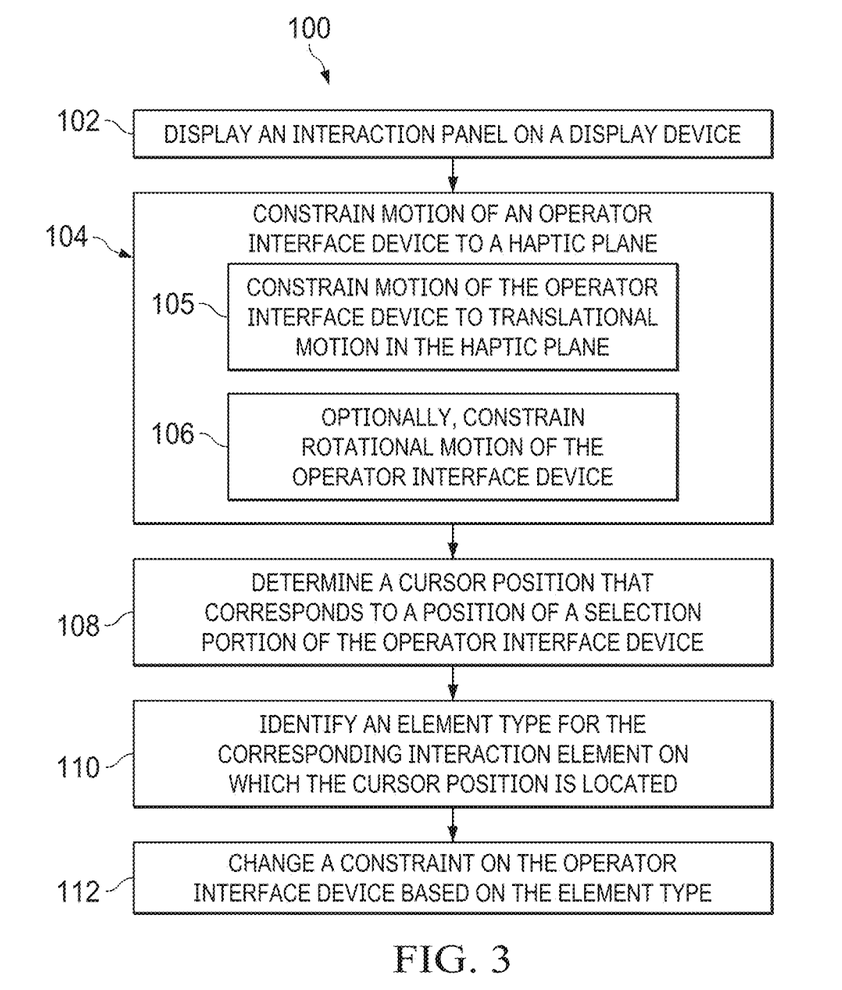
FIG. 3 is a flowchart illustrating a method for changing a constraint on an operator interface device based on displayed interaction elements, according to some examples.

FIG. 3 is a flowchart illustrating a method 100 for changing a constraint on an operator interface device based on displayed interaction elements. The methods described herein are illustrated as a set of operations or processes and are described with continuing reference to the additional figures. Not all of the illustrated processes may be performed in all embodiments of the methods. Additionally, one or more processes that are not expressly illustrated in may be included before, after, in between, or as part of the illustrated processes. In some embodiments, one or more of the processes may be implemented, at least in part, in the form of executable code stored on non-transitory, tangible, machine-readable media that when run by one or more processors (e.g., the processors of a control system) may cause the one or more processors to perform one or more of the processes. In one or more embodiments, the processes may be performed by a control system.

With reference to FIG. 3, at a process 102, an interaction panel (e.g. interaction panel 56) may be displayed on a display device (e.g., display system 52). At a process 104, motion of an operator interface device may be constrained to a haptic plane. The process 104 may include a process 105 of constraining motion of the operator interface device to translational motion in the haptic plane. For example, the motion of the operator interface device 10 may be constrained by force feedback to permit translational motion in directions $X_O$, $Y_O$ in a virtual plane in the operator frame of reference that corresponds to the plane of the interaction panel in the image frame of reference $X_I$, $Y_I$, $Z_I$. Motion of the operator interface device 10 in the translational direction $Z_O$ may be haptically restricted to prevent the operator from perceiving that the operator interface device 10 is punching through or lifting off of haptic plane that corresponds to the interaction panel 56. Tracked motion of a selection portion of the operator interface device, such as the selection portion 16 portion engaged with the operator's index finger, may be displayed as corresponding cursor motion across the interaction panel. The process 104 may also include an optional process 106, in which rotational motion of the operator interface device is constrained. For example, the motion of the operator interface device 10 may be constrained by force feedback to prohibit rotational motion. Enforcing the constraint may include locking gimbal degrees of freedom for the operator interface device 10 to prevent rotational motion out of the haptic plane. Thus, all motion in the haptic plane may be constrained to translational motion in the $X_O$, $Y_O$ directions.

At a process 108, a cursor position that corresponds to the selection portion of the operator interface device may be determined. For example, a position of the cursor 58 that corresponds to the selection portion 16 of the operator interface device 10 may be determined relative to the interaction panel 56. The cursor position may be associated with the interaction element over which the cursor is positioned. With reference to FIG. 2, for example, the cursor 58 is positioned over and corresponds to the interaction element 60.

At a process 110, an element type is determined for the interaction element on which the cursor position is located. For example, with the cursor 58 positioned over the interaction element 60, the interaction element 60 is identified by the cursor. An element type associated with the interaction element 60 may be identified. The element type may be predetermined based on the degrees of freedom of motion associated with the interaction element. The interaction element 60 may have an element type that is a three-dimensional (3D) rotation type because the interaction element 60 is an anatomic model that may be manipulated in three rotational degrees of freedom about the centroid 62 based on movement of the operator interface device 10. The interaction element 64 may be identified as a one-dimensional translation type interaction element that is manipulatable in a single linear direction. The interaction element 66 may be identified as a one-dimensional rotation type interaction element that is manipulatable in a single rotational direction. The interaction element 68 may be identified as a two-dimensional translation type interaction element that is manipulatable in a two translational directions.

In other examples, interaction elements may be identified with other element types based on motion or other interactive parameters of the interaction element.

If interaction elements are layered in the display on the display device, the element type may be determined for the top-most interaction element over which the cursor is positioned. In some examples, multi-layered haptic planes are provided. A user may be permitted to push through a top haptic plane to access and control interaction elements on lower layers.

At a process 112, a constraint on the operator interface device may be changed based on the identified element type. FIG. 4-7 describe methods 112A-112D, respectively that illustrate alternative examples for changing constraints on the operator interface device based on the identified element type.

Figure 4:
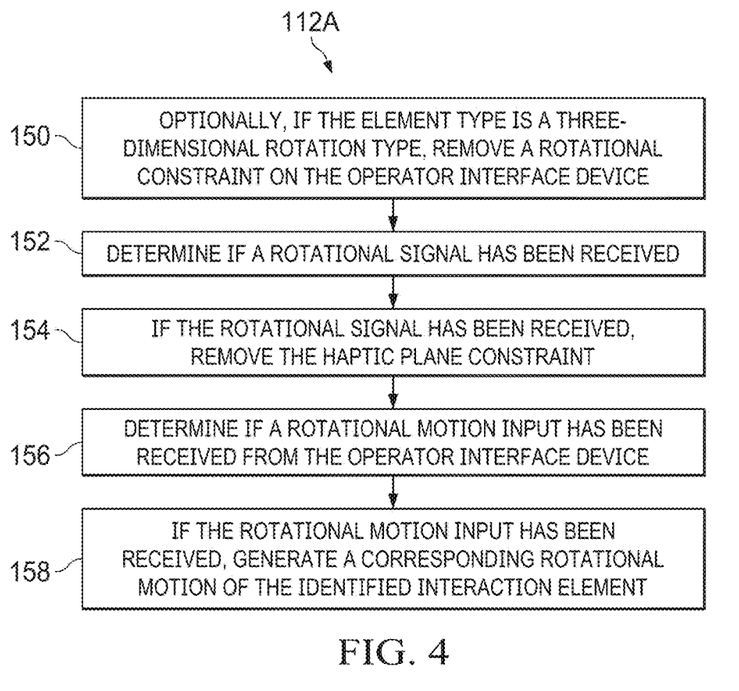
FIG. 4 is a flowchart illustrating a method for manipulating a three-dimensional interaction element, according to some examples.

With reference to method 112A of FIG. 4, at an optional process 150, the rotational constraint (e.g. the constraint of process 106) on the operator device may be removed if the element type is a three-dimensional rotation type. For example, with the interaction element 60 identified as a 3D rotation type interaction element, the rotational constraint on the operator interface device 10 may be removed to allow the operator to rotate the operator interface device about an axis perpendicular to the haptic plane (e.g. wrist rotation about a roll axis) while the haptic plane continues to restrict translational motion in the $Z_O$ direction and rotation about axes along the haptic plane (e.g., pitch and yaw directions about axes lying in the haptic plane) Removing the rotational constraint may include removing or relaxing the locking forces on the gimbals of the operator interface device 10.

At a process 152, a determination may be made as to whether a rotational signal has been received. For example, a rotational signal may indicate the operator's intent to manipulate the 3D rotatable interaction element 60. The rotational signal may be a selection input at the operator interface device 10 such as a pinch gesture, a depressed button, or any other gesture, cue, or input at the operator interface device indicating the operator's intent to rotate the interaction element. In some examples, the cursor may disappear from the display when the rotational signal is received.

At a process 154, some or all of the haptic plane constraint may be removed if the rotational signal is received at process 152. For example, the haptic plane constraining motion on the operator interface device 10 may be removed such that the operator interface device 10 is free to move in six degrees of freedom (3 translational, 3 rotational). The motion of the interaction element 60 may directly track the motion of the operator interface device 10, allowing translational motion of the interaction element 60 (e.g., the anatomic model) in $X_I$, $Y_I$, $Z_I$ directions and rotation of the interaction element 60 about the centroid 62 in roll, pitch, and yaw directions. When an operator feels the sensation of the sudden removal of the haptic plane constraint, the felt sensation may serve as a haptic feedback cue, suggesting to the operator that the underlying interface element is an interface element that may be manipulated with three-dimensional motion. In some examples, a visual cue such as an outline, highlight, glow effect or other cue may be provided to indicate that the interaction element is rotatable.

At a process 156, a determination may be made as to whether a rotational motion input has been received from the operator interface device. For example, rotation of the operator interface device 10 may generate a rotational motion input. At a process 158, with receipt of the rotational motion input from the operator interface device, a corresponding rotational motion of the identified interaction element may be generated. For example, the receipt of the rotational motion input from the operator interface device 10 in the operator frame of reference may generate a corresponding rotational motion of the interaction element 60 in the image frame of reference. The interaction element 60 may be freely rotated and translated in six degrees of freedom according to the tracked motion of the operator interface device 10. In some examples, the rotational signal (e.g., the pinch gesture by the operator at the operator interface device) may be maintained throughout the duration of the rotational motion input.

When the rotational signal is terminated, the haptic plane constraint may be restored to the operator interface device. For example, terminating the pinch gesture may terminate the rotational signal and restore the haptic plane constraint. Unpinching the operator interface device may serve as a clutching gesture that allows the operator to adjust to a more comfortable hand position before again pinching the operator interface device to continue the rotational motion of the operator interface device and the corresponding rotational motion of the interaction element. When the rotational signal is terminated and the cursor position is moved away from the 3D rotational type interaction element, the rotational constraint of process 106 may also be restored.

Figure 5:
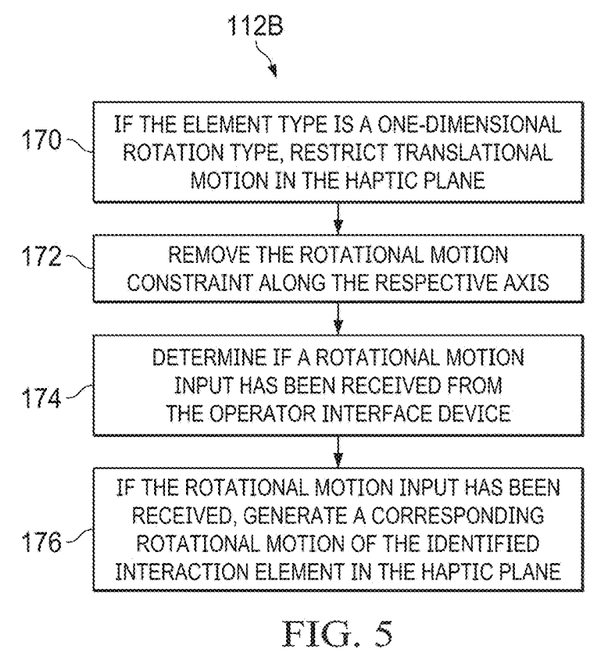
FIG. 5 is a flowchart illustrating a method for manipulating a one-dimensional rotation interaction element, according to some examples.

With reference to method 112B of FIG. 5, at a process 170, translational motion on the haptic plane may be restricted if the element type is a one-dimensional ("1D") rotation type (e.g., a dial interface element). For example, with the interaction element 66 identified as a 1D rotation type interaction element, translational motion of the operator interface device 10 in the $X_O$, $Y_O$, $Z_O$ directions may be restricted.

At a process 172, the rotational constraint (e.g. the constraint of process 106) on the operator device may be removed along an axis corresponding to the rotational axis of the interaction element if the element type is a 1D rotation type. For example, with the interaction element 66 identified as a 1D rotation type interaction element, the rotational constraint on the operator interface 10 may be removed to allow the operator to rotate the operator interface device about an axis perpendicular to the haptic plane (e.g. wrist rotation about a roll axis) while translational motion in the $X_O$, $Y_O$, $Z_O$ directions continues to be restricted and rotational motion about axes along the haptic plane (e.g., pitch and yaw directions about axes lying in the haptic plane) continues to be restricted.

At a process 174, a determination may be made as to whether a rotational motion input has been received from the operator interface device. For example, rotation of the operator interface device 10 may generate a rotational motion input. At a process 176, with receipt of the rotational motion input from the operator interface device, a corresponding rotational motion of the identified interaction element may be generated. For example, the receipt of the rotational motion input from the operator interface device 10 in the operator frame of reference may generate a corresponding rotational motion of the interaction element 66 in the image frame of reference. The interaction element 66 may be freely rotated in a single degree of freedom according to the tracked motion of the operator interface device 10. When the rotational motion input is terminated and the cursor position is moved away from the 1D rotational type interaction element, the rotational constraint of process 106 may be restored.

Figure 6:
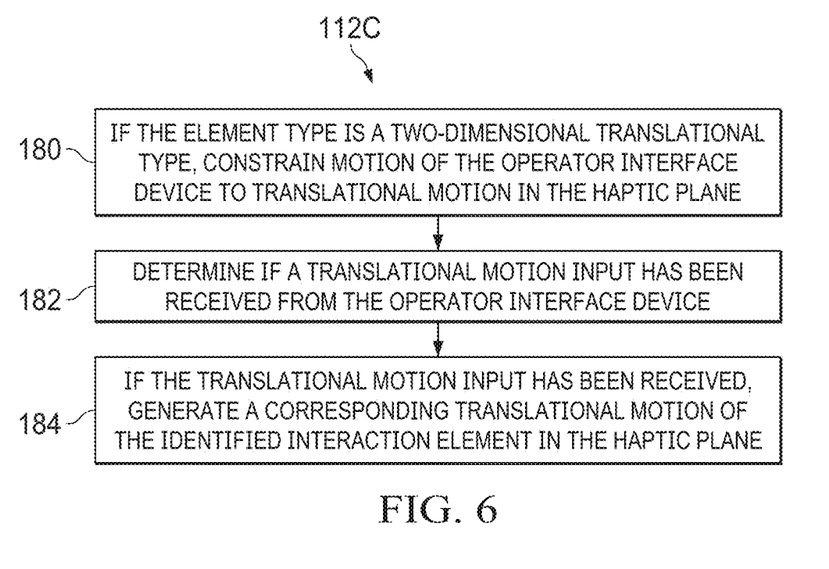
FIG. 6 is a flowchart illustrating a method for manipulating a two-dimensional translational interaction element, according to some examples.

With reference to method 112C of FIG. 6, at a process 180, motion of the operator interface device may be constrained to permit only translational motion along the haptic plane, if the element type is a two-dimensional rotation type (e.g., a 2D meu interface element). For example, with the interaction element 68 identified as a 2D translation type interaction element, motion of the operator interface device 10 may be constrained to motion in the $X_O$, $Y_O$ directions.

At a process 182, a determination may be made as to whether a translational motion input has been received from the operator interface device. For example, translation of the operator interface device 10 in directions $X_O$, $Y_O$ may generate a translational motion input. At a process 184, with receipt of the translational motion input from the operator interface device, a corresponding translational motion of the identified interaction element may be generated. For example, the receipt of the motion input signal from the operator interface device 10 in the operator frame of reference may generate a corresponding translational motion of the interaction element 68 in the image frame of reference. The interaction element 68 may include menu columns and rows that become visible based on translational motion in directions $X_I$, $Y_I$, according to the tracked motion of the operator interface device 10.

Figure 7:
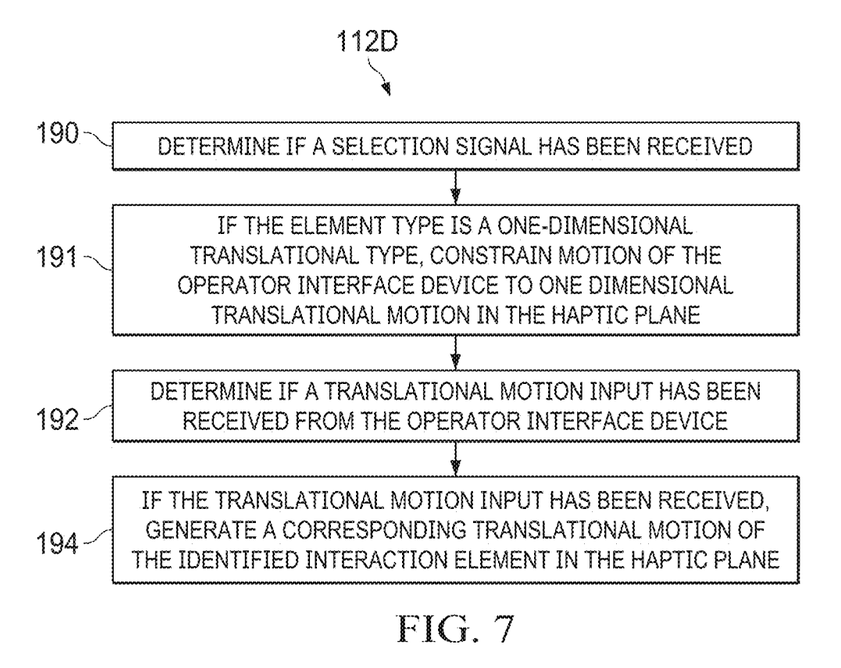
FIG. 7 is a flowchart illustrating a method for manipulating a one-dimensional translational interaction element, according to some examples.

With reference to method 112D of FIG. 7, at a process 190, a determination may be made as to whether a selection signal has been received. For example, a selection signal may indicate the operator's intent to manipulate a 1D slider interaction element 60. The selection signal may be an input at the operator interface device 10 such as a pinch gesture, a depressed button, mouse click, or any other gesture, cue, or input at the operator interface device that signals the operator's intent to translate the interaction element. In some examples, the cursor may disappear from the display when the selection signal is received.

At a process 191, motion of the operator interface device may be constrained to permit translational motion along a single direction of the haptic plane, if the element type is a one-dimensional translation type (e.g., a 1D slider interface element) and the selection signal is received. For example, with the interaction element 64 identified as a 1D translation type interaction element, motion of the operator interface device 10 may be constrained to motion in the $X_O$ direction. Optionally, one or more rotational constraints on the operator interface device (e.g., restraints on the gimbal joints of the operator interface device) may be removed, allowing the operator's to rotate more naturally while controlling the slider element.

At a process 192, a determination may be made as to whether a translational motion input has been received from the operator interface device. For example, translation of the operator interface device 10 in a directions $X_O$ may generate a translational motion input. At a process 184, with receipt of the translational motion input from the operator interface device, a corresponding translational motion of the identified interaction element may be generated. For example, the receipt of the motion input from the operator interface device 10 in the operator frame of reference may generate a corresponding translational motion of the interaction element 64 in the $X_I$ direction of the image frame of reference.

FIGS. 8-11 together provide an overview of a medical system 310 that may be used in, for example, medical procedures including diagnostic, therapeutic, or surgical procedures. The examples provided above for using the operator interface device to interface with interaction elements may be used in the context of the medical system 310. The medical system 310 is located in a medical environment 311. The medical environment 311 is depicted as an operating room in FIG. 8. In other embodiments, the medical environment 311 may be an emergency room, a medical training environment, a medical laboratory, or some other type of environment in which any number of medical procedures or medical training procedures may take place. In still other embodiments, the medical environment 311 may include an operating room and a control area located outside of the operating room.

Figure 8:
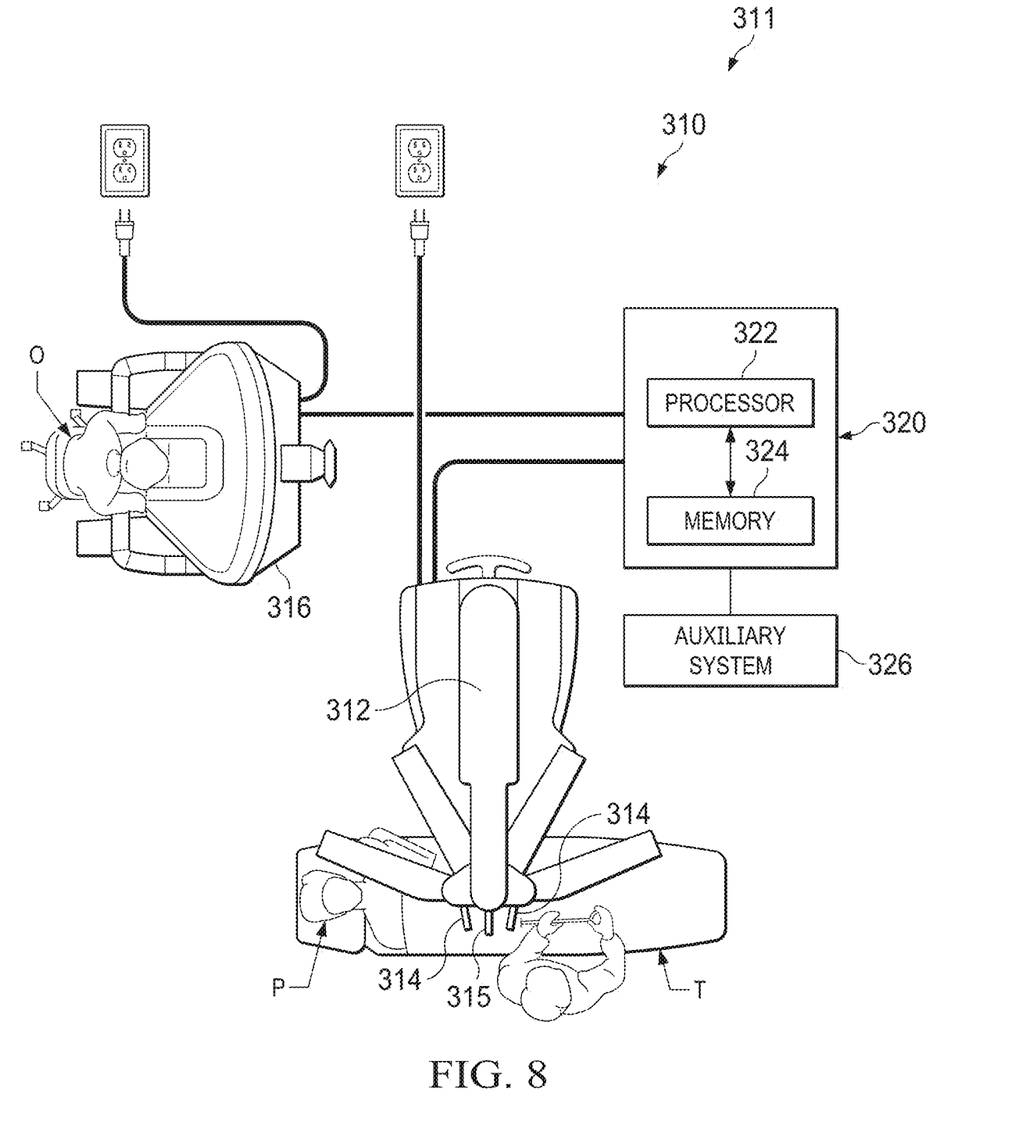
FIG. 8 illustrates a schematic view of a medical system, according to some examples.

In one or more embodiments, the medical system 310 may be a robot-assisted medical system that is under the teleoperational control of an operator (e.g., a surgeon, a clinician, a physician, etc.). In alternative embodiments, the medical system 310 may be under the partial control of a computer programmed to perform the medical procedure or sub-procedure. In still other alternative embodiments, the medical system 310 may be a fully automated medical system that is under the full control of a computer programmed to perform the medical procedure or sub-procedure with the medical system 310. One example of the medical system 310 that may be used to implement the systems and techniques described in this disclosure is the da Vinci® Surgical System manufactured by Intuitive Surgical, Inc. of Sunnyvale, California.

As shown in FIG. 8, the medical system 310 generally includes an assembly 312, which may be mounted to or positioned near an operating table T on which a patient P is positioned. The assembly 312 may be referred to as a patient side cart, a surgical cart, or a surgical robot. In one or more embodiments, the assembly 312 may be a teleoperational assembly. The teleoperational assembly may be referred to as, for example, a teleoperational arm cart. A medical instrument system 314 and an endoscopic imaging system 315 are operably coupled to the assembly 312. An operator input system 316 allows an operator O or other type of clinician to view images of or representing the surgical site and to control the operation of the medical instrument system 314 and/or the endoscopic imaging system 315.

The medical instrument system 314 may comprise one or more medical instruments. In embodiments in which the medical instrument system 314 comprises a plurality of medical instruments, the plurality of medical instruments may include multiple of the same medical instrument and/or multiple different medical instruments. Similarly, the endoscopic imaging system 315 may comprise one or more endoscopes.

The operator input system 316 may be located at a operator's control console, which may be located in the same room as operating table T. In some embodiments, the operator O and the operator input system 316 may be located in a different room or a completely different building from the patient P. The operator input system 316 generally includes one or more interface device(s) (e.g. operator interface device 10) for controlling the medical instrument system 314. The interface device(s) may include one or more of any number of a variety of input devices, such as hand grips, joysticks, trackballs, data gloves, trigger-guns, foot pedals, hand-operated controllers, voice recognition devices, touch screens, body motion or presence sensors, and other types of input devices.

In some embodiments, the interface device(s) will be provided with the same degrees of freedom as the medical instrument(s) of the medical instrument system 314 to provide the operator with telepresence, which is the perception that the interface device(s) are integral with the instruments so that the operator has a strong sense of directly controlling instruments as if present at the surgical site. In other embodiments, the interface device(s) may have more or fewer degrees of freedom than the associated medical instruments and still provide the operator with telepresence. In some embodiments, the interface device(s) are manual input devices that are movable with six degrees of freedom, and which may also include an actuatable handle for actuating instruments (for example, for closing grasping jaw end effectors, applying an electrical potential to an electrode, delivering a medicinal treatment, and actuating other types of instruments).

The assembly 312 supports and manipulates the medical instrument system 314 while the operator O views the surgical site through the operator input system 316. An image of the surgical site may be obtained by the endoscopic imaging system 315, which may be manipulated by the assembly 312. The assembly 312 may comprise endoscopic imaging systems 315 and may similarly comprise multiple medical instrument systems 314 as well. The number of medical instrument systems 314 used at one time will generally depend on the diagnostic or surgical procedure to be performed and on space constraints within the operating room, among other factors. The assembly 312 may include a kinematic structure of one or more non-servo controlled links (e.g., one or more links that may be manually positioned and locked in place, generally referred to as a set-up structure) and a manipulator. When the manipulator takes the form of a teleoperational manipulator, the assembly 312 is a teleoperational assembly. The assembly 312 includes a plurality of motors that drive inputs on the medical instrument system 314. In an embodiment, these motors move in response to commands from a control system (e.g., control system 320). The motors include drive systems which when coupled to the medical instrument system 314 may advance a medical instrument into a naturally or surgically created anatomical orifice. Other motorized drive systems may move the distal end of said medical instrument in multiple degrees of freedom, which may include three degrees of linear motion (e.g., linear motion along the X, Y, Z Cartesian axes) and three degrees of rotational motion (e.g., rotation about the X, Y, Z Cartesian axes). Additionally, the motors may be used to actuate an articulable end effector of the medical instrument for grasping tissue in the jaws of a biopsy device or the like. Medical instruments of the medical instrument system 314 may include end effectors having a single working member such as a scalpel, a blunt blade, an optical fiber, or an electrode. Other end effectors may include, for example, forceps, graspers, scissors, or clip appliers.

The medical system 310 also includes a control system 320. The control system 320 includes at least one memory 324 and at least one processor 322 for effecting control between the medical instrument system 314, the operator input system 316, and other auxiliary systems 326 which may include, for example, imaging systems, audio systems, fluid delivery systems, display systems, illumination systems, steering control systems, irrigation systems, and/or suction systems. A clinician may circulate within the medical environment 311 and may access, for example, the assembly 312 during a set up procedure or view a display of the auxiliary system 326 from the patient bedside.

Though depicted as being external to the assembly 312 in FIG. 8, the control system 320 may, in some embodiments, be contained wholly within the assembly 312. The control system 320 also includes programmed instructions (e.g., stored on a non-transitory, computer-readable medium) to implement some or all of the methods described in accordance with aspects disclosed herein. While the control system 320 is shown as a single block in the simplified schematic of FIG. 8, the control system 320 may include two or more data processing circuits with one portion of the processing optionally being performed on or adjacent the assembly 312, another portion of the processing being performed at the operator input system 316, and the like.

Any of a wide variety of centralized or distributed data processing architectures may be employed. Similarly, the programmed instructions may be implemented as a number of separate programs or subroutines, or they may be integrated into a number of other aspects of the systems described herein, including teleoperational systems. In one embodiment, the control system 320 supports wireless communication protocols such as Bluetooth, IrDA, HomeRF, IEEE 802.11, DECT, and Wireless Telemetry.

In some embodiments, control system 320 may include one or more servo controllers that receive force and/or torque feedback from the medical instrument system 314. Responsive to the feedback, the servo controllers transmit signals to the operator input system 316. The servo controller(s) may also transmit signals instructing assembly 312 to move the medical instrument system(s) 314 and/or endoscopic imaging system 315 which extend into an internal surgical site within the patient body via openings in the body. Any suitable conventional or specialized servo controller may be used. A servo controller may be separate from, or integrated with, assembly 312. In some embodiments, the servo controller and assembly 312 are provided as part of a teleoperational arm cart positioned adjacent to the patient's body.

The control system 320 can be coupled with the endoscopic imaging system 315 and can include a processor to process captured images for subsequent display, such as to an operator on the operator's control console, or on another suitable display located locally and/or remotely. For example, where a stereoscopic endoscope is used, the control system 320 can process the captured images to present the operator with coordinated stereo images of the surgical site. Such coordination can include alignment between the opposing images and can include adjusting the stereo working distance of the stereoscopic endoscope.

In alternative embodiments, the medical system 310 may include more than one assembly 312 and/or more than one operator input system 316. The exact number of assemblies 312 will depend on the surgical procedure and the space constraints within the operating room, among other factors. The operator input systems 316 may be collocated or they may be positioned in separate locations. Multiple operator input systems 316 allow more than one operator to control one or more assemblies 312 in various combinations. The medical system 310 may also be used to train and rehearse medical procedures.

Figure 9:
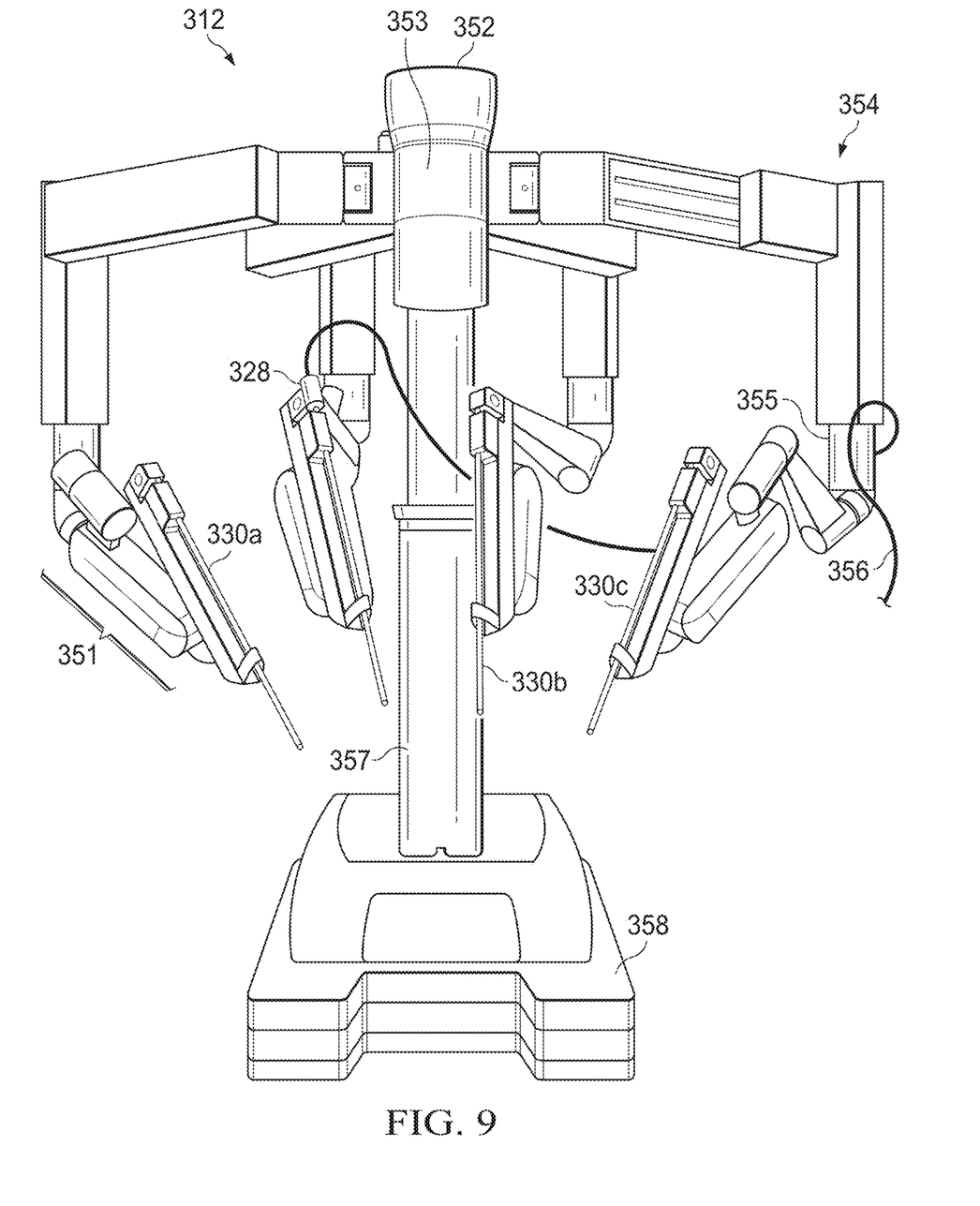
FIG. 9 is a perspective view of a manipulator assembly of the medical system of FIG. 8, according to some examples.

FIG. 9 is a perspective view of one embodiment of an assembly 312 which may be referred to as a patient side cart, surgical cart, teleoperational arm cart, manipulator assembly or surgical robot. The assembly 312 shown provides for the manipulation of three surgical tools 330a, 330b, and 330c (e.g., medical instrument systems 314) and an imaging device 328 (e.g., endoscopic imaging system 315), such as a stereoscopic endoscope used for the capture of images of the site of the procedure. The imaging device may transmit signals over a cable 356 to the control system 320. Manipulation is provided by teleoperative mechanisms having a number of joints. The imaging device 328 and the surgical tools 330a-c can be positioned and manipulated through incisions in the patient so that a kinematic remote center is maintained at the incision to minimize the size of the incision. Images of the surgical site can include images of the distal ends of the surgical tools 330a-c when they are positioned within the field of view of the imaging device 328.

The assembly 312 includes a drivable base 358. The drivable base 358 is connected to a telescoping column 357, which allows for adjustment of the height of arms 354. The arms 354 may include a rotating joint 355 that both rotates and moves up and down. Each of the arms 354 may be connected to an orienting platform 353. The arms 354 may be labeled to facilitate trouble shooting. For example, each of the arms 354 may be emblazoned with a different number, letter, symbol, other identifier, or combinations thereof. The orienting platform 353 may be capable of 360 degrees of rotation. The assembly 312 may also include a telescoping horizontal cantilever 352 for moving the orienting platform 353 in a horizontal direction.

In the present example, each of the arms 354 connects to a manipulator arm 351. The manipulator arms 351 may connect directly to a medical instrument, e.g., one of the surgical tools 330a-c. The manipulator arms 351 may be teleoperable or robotically assisted. In some examples, the arms 354 connecting to the orienting platform 353 may not be teleoperable or robotically assisted. Rather, such arms 354 may be positioned as desired before the operator O begins operation with the teleoperative components.

Endoscopic imaging systems (e.g., endoscopic imaging system 315 and imaging device 328) may be provided in a variety of configurations including rigid or flexible endoscopes. Rigid endoscopes include a rigid tube housing a relay lens system for transmitting an image from a distal end to a proximal end of the endoscope. Flexible endoscopes transmit images using one or more flexible optical fibers. Digital image-based endoscopes have a "chip on the tip" design in which a distal digital sensor such as a one or more charge-coupled device (CCD) or a complementary metal oxide semiconductor (CMOS) device store image data. Endoscopic imaging systems may provide two- or three-dimensional images to the viewer. Two-dimensional images may provide limited depth perception. Three-dimensional stereo endoscopic images may provide the viewer with more accurate depth perception. Stereo endoscopic instruments employ stereo cameras to capture stereo images of the patient anatomy. An endoscopic instrument may be a fully sterilizable assembly with the endoscope cable, handle and shaft all rigidly coupled and hermetically sealed.

Figure 10:
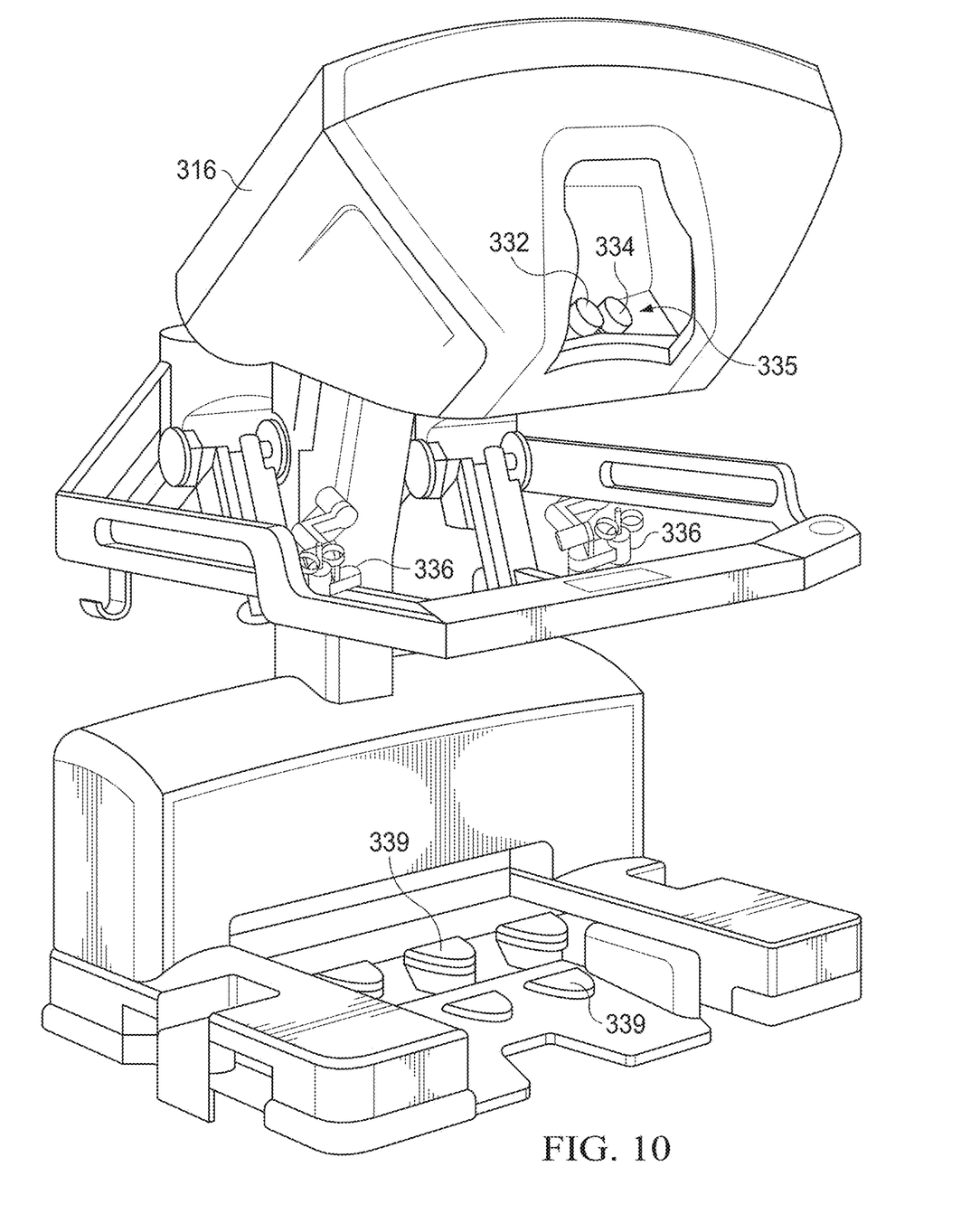
FIG. 10 is a front elevation view of an operator's console in a robot-assisted medical system, according to some examples.

FIG. 10 is a perspective view of an embodiment of the operator input system 316 at the operator's control console. The operator input system 316 includes a head-in display system 335 (e.g. display system 14) with a left eye display 332 and a right eye display 334 for presenting the operator O with a coordinated stereo view of the surgical environment that enables depth perception. In other embodiments, the display system 335 may include one or more other types of displays. The display system 335 may present images captured, for example, by the imaging system 315 to display the endoscopic field of view to the operator. The endoscopic field of view may be augmented by virtual or synthetic menus, indicators, and/or other graphical or textual information to provide additional information to the viewer.

The operator input system 316 further includes one or more interface devices 336, which in turn cause the assembly 312 to manipulate one or more instruments of the endoscopic imaging system 315 and/or medical instrument system 314. As described above, in an auxiliary mode, the interface devices may also control motion of interaction elements of a displayed interaction panel. The interface devices 336 can provide the same degrees of freedom as their associated instruments to provide the operator O with telepresence, or the perception that the interface devices 336 are integral with said instruments so that the operator has a strong sense of directly controlling the instruments. To this end, position, force, and tactile feedback sensors (not shown) may be employed to transmit position, force, and tactile sensations from the medical instruments, e.g., surgical tools 330a-c, or imaging device 328, back to the operator's hands through the input interface devices 336. Interface devices 339 are foot pedals that receive input from a user's foot. Aspects of the operator input system 316, the assembly 312, and the auxiliary systems 326 may be adjustable and customizable to meet the physical needs, skill level, or preferences of the operator O.

Figure 11:
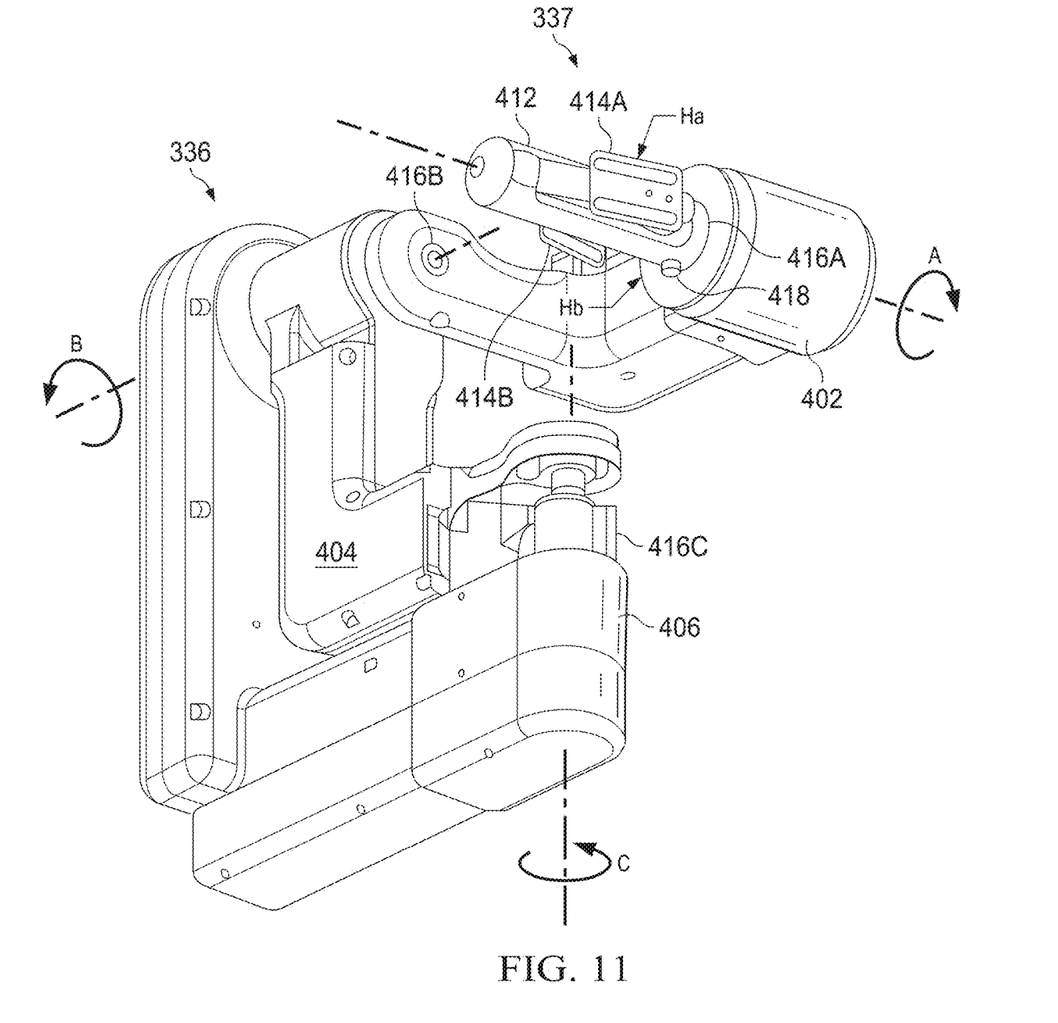
FIG. 11 is a perspective view of an exemplary gimbaled device of the operator's console of FIG. 10 to control one or more arms and/or tools coupled of the robot-assisted medical system, according to some examples.

Referring now to 11, shown therein is a perspective view of an embodiment of one of the interface devices 336 with a finger assembly 337. The finger assembly 337 may correspond to the selection portion 16 of the interface device 10. Embodiments of the interface device 336 as shown in FIG. 11 may be used as the interface devices 10, 12. The interface device 336 is a gimbaled device that pivotally supports the assembly 337, which may include a touch sensitive handle to generate control signals that are used to control the assembly 302, the robotic medical tools, and or interaction elements.

The depicted interface device 336 includes first, second, and third gimbal members 402, 404, and 406. The restraint forces described above to constrain motion of the operator interface device may be applied to prevent motion at one or more of the gimbal members. The touch sensitive handle provided by finger assembly 337 includes a tubular support structure 412, a first grip 414A, and a second grip 414B. The first grip 414A and the second grip 414B are supported at one end by the structure 412. In some embodiments, the grips 414 may include loops of material that help secure the physician's fingers in place relative to the structure of the grips. Additionally, some embodiments may include more than two grips connected to the support structure 412 or two grips 414 and another control mechanism, like a button, switch, track pad, or scroll-wheel. For example, the interface device 336 may include a button 418 that may be activated by the physician to switch control modes or perform a particular action. As shown, the button 418 is mounted at a proximal end of the support structure 412, disposed between the grips 414, such that it can be actuated when a hand grips the support structure 412. The button 418 may include a redundant button or a similar but non-redundant button disposed on the opposite side of the support structure 412. However, one or more similar buttons may be positioned elsewhere in other embodiments. The finger assembly 337 can be rotated about axis A, illustrated in FIG. 11. The grips 414A and 414B can be squeezed or pinched together about the tubular structure 412. The "pinching" or grasping degree of freedom in the grips is indicated by arrows Ha and Hb. These or other movements of the grips 414 relative to the support structure 412 may provide commands to manipulate the tools 330a-c.

The finger assembly 337 is rotatably supported by the first gimbal member 402 by means of a rotational joint 416A. The first gimbal member 402 is in turn, rotatably supported about axis B by the second gimbal member 404 by means of the rotational joint 416B. Similarly, the second gimbal member 404 is rotatably supported about axis C by the third gimbal member 406 using a rotational joint 416C. In this manner, the interface device 336 allows the finger assembly 337 to be moved and oriented in the workspace using three degrees of freedom.

The movements in the gimbals of the master interface device 336 to reorient the finger assembly 337 in space can be translated into control signals to control an arm/tool combination. For example, the rotational motion of the finger assembly 337 about axis A in FIG. 15 may be used to roll instrument 330a about its shaft axis. Alternatively or additionally, the squeezing motion of the grips 414A, 414B over their freedom of movement indicated by arrows Ha and Hb, may be used to command a grasping motion with forceps, or a cutting motion with scissors, or control the flow of fluids through the suction/irrigator robotic medical tool positioned at the interventional site, for example. The grips 414 may be passively biased to spring open, providing a restoring force to release forceps, open scissors, etc. To sense the movements in the touch sensitive handle and generate controls signals for the instruments 330, sensors can be mounted in the finger assembly 337 as well as the gimbal members of the interface device 336. Exemplary sensors may include a Hall effect transducer, a potentiometer, an encoder, or the like.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Any alterations and further modifications to the described devices, systems, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately.

Various systems and portions of systems have been described in terms of their state in three-dimensional space. As used herein, the term "position" refers to the location of an object or a portion of an object in a three-dimensional space (e.g., three degrees of translational freedom along Cartesian X, Y, Z coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom).

Although some of the examples described herein refer to surgical procedures or instruments, or medical procedures and medical instruments, the techniques disclosed optionally apply to non-medical procedures and non-medical instruments. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or non-medical personnel. Additional example applications include use for procedures on tissue removed from human or animal anatomies (without return to a human or animal anatomy) and performing procedures on human or animal cadavers. Further, these techniques can also be used for surgical and nonsurgical medical treatment or diagnosis procedures.

A computer is a machine that follows programmed instructions to perform mathematical or logical functions on input information to produce processed output information. A computer includes a logic unit that performs the mathematical or logical functions, and memory that stores the programmed instructions, the input information, and the output information. The term "computer" and similar terms, such as "processor" or "controller" or "control system," are analogous.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A method comprising:
    displaying an interaction panel on a display device, the interaction panel having a display frame of reference and including a plurality of interaction elements;
    constraining motion of an operator interface device to translational motion in a haptic plane with a haptic plane constraint while the interaction panel is displayed;
    determining a cursor position in the display frame of reference that corresponds to a position of a selection portion of the operator interface device in an operator frame of reference;
    determining an element type for a first interaction element of the plurality of interaction elements at which the cursor position is located; and
    removing the haptic plane constraint on the operator interface device if the element type is a three-dimensional rotation type.

2. The method of claim 1 further comprising:
    constraining rotational motion of the operator interface device with a rotational constraint while the interaction panel is displayed.

3. The method of claim 2 further comprising:
    removing the rotational constraint on the operator interface device if the element type is a three-dimensional rotation type.

4. The method of claim 3 further comprising:
    determining if the cursor position has moved off the first interaction element, and if so, restoring the haptic plane constraint and the rotational constraint on the operator interface device.

5. The method of claim 1 further comprising:
    receiving a rotational motion input from the operator interface device in the operator frame of reference.

6. The method of claim 5 further comprising:
    generating a rotational motion for the first interaction element in the display frame of reference that corresponds to the rotational motion input from the operator interface device.

7. The method of claim 1 wherein removing the haptic plane constraint on the operator interface device is further based on receipt of a rotation signal from the operator interface device.

8. The method of claim 7 wherein the rotation signal includes a pinch gesture on the operator interface device.

9. The method of claim 7 wherein a marker of the cursor position disappears when the rotation signal is received.

10. The method of claim 1, wherein the operator interface device has a plurality of translational and rotational degrees of freedom.

11. The method of claim 1, wherein the interaction panel includes a menu element responsive to translational motion of an operator interface device in the haptic plane.

12. The method of claim 1, wherein the haptic plane constraint is generated by a restraint force provided to the operator interface device.

13. The method of claim 1, wherein a cursor marker may be displayed at the cursor position on the display device.

14. The method of claim 1, wherein the selection portion of the operator interface device is a tip portion of the operator interface device.

15. The method of claim 1, wherein the element type is a three-dimensional rotation type.

16. The method of claim 1, wherein the element type is a two-dimensional translation type, the method further comprising:
    constraining motion of the operator interface device to motion in the haptic plane if the element type is a two-dimensional rotation type.

17. The method of claim 1, wherein the element type is a single dimension translation type, the method further comprising:
    constraining motion of the operator interface device to a single translational direction in the haptic plane if the element type is a single dimension translation type.

18. The method of claim 1, wherein the element type is a single dimension rotation type, the method further comprising:
    constraining motion of the operator interface device to rotational motion in the haptic plane if the element type is a single dimension rotation type.

19. The method of claim 1 wherein the interaction panel is displayed on the display device while a control system is in an auxiliary mode.

20. The method of claim 1 wherein the interaction panel is displayed over a field of view image on the display device.

* * * * *